United States Patent [19]

Baumann

[11] 4,320,778
[45] Mar. 23, 1982

[54] MINUTE FLOW REGULATING VALVE

[76] Inventor: Hans D. Baumann, P.O. Box 471, Rye, N.H. 03870

[21] Appl. No.: 241,593

[22] Filed: Mar. 9, 1981

Related U.S. Application Data

[63] Continuation-in-part of Ser. No. 146,630, May 5, 1980, Pat. No. 4,278,234.

[51] Int. Cl.³ .......................................... F16K 31/122
[52] U.S. Cl. .................................. 137/454.6; 251/57; 251/122; 251/205; 236/99 R; 138/45; 138/46
[58] Field of Search .............................. 138/43, 45, 46; 137/508, 510, 469, 454.2, 454.6; 236/99 R; 251/57, 62, 63.4, 63.5, 63.6, 118, 121, 122, 205, 77

[56] References Cited
U.S. PATENT DOCUMENTS

| | | | |
|---|---|---|---|
| 962,736 | 6/1910 | Bice | 251/63.4 |
| 2,966,170 | 12/1960 | Raulins | 251/205 |
| 3,008,684 | 11/1961 | Frame | 251/57 |
| 3,113,756 | 12/1963 | Griffo | 251/57 |
| 3,380,470 | 4/1968 | Culpepper, Jr. et al. | 251/57 |
| 3,452,776 | 7/1969 | Chenoweth | 137/454.6 |
| 3,633,608 | 1/1972 | Minkner | 251/57 |
| 3,840,207 | 10/1974 | Carpenter | 251/57 |

Primary Examiner—George L. Walton

[57] ABSTRACT

A regulating valve capable of precisely controlling minute amounts of gaseous or liquid fluids following an electronic, pneumatic or manual command wherein the fluid is throttled between parallel surfaces which are part of a replaceable trim insert and which are positioned in respect to each other through the use of hydraulic amplifying means.

6 Claims, 1 Drawing Figure

MINUTE FLOW REGULATING VALVE

BACKGROUND OF THE INVENTION

This invention is the further improvement of and based on my Adjustable Laminar Flow Restriction, U.S. Pat. No. 3,144,879 issued Aug. 18, 1964, and a continuation in part of my U.S. patent application Ser. No. 146,630, dated May 5, 1980, now U.S. Pat. No. 4,278,234.

More specifically, it is an adaptation of the Laminar Flow Restriction principle for use as automatically operated small flow control valves, as required by the process control industry and particularly by reduced scale pilot plants or laboratories.

This invention relates to a device capable of restricting the flow of liquid or gaseous media by producing a laminar flow pattern, where the potential energy of the passing fluid is gradually reduced through viscous shear friction along a very narrow opening. The efficiency of such a device depends on the ability to offer as much wetted surface to the passing fluid as possible without necessitating an increase in flow area. This can be better understood by comparing my invention with a piece of tubing. The hydraulic diameter governing the Reynolds number and consequently the amount of fluid friction created in a typical restriction may be written as $$d = 4A/U$$

where A is a flow area and U is the length of wetted surface surrounding the flow area in question. Then for a simple tube or orifice with $a = 0.785$ the hydralic diameter $d = 1$. Assuming the identical flow area of $A = 0.785$ and 1 as diameter of the inner flow cavity in my invention, d is then calculated to be 0.5 or only half of that of a simple orifice by providing two wetted surfaces instead of one.

Further decrease in d can be obtained by selection of a large internal diameter to flow area ratio which is not possible in orifices. Fine tapered needle valves have been used to provide laminar flow restrictions in the past, where the fluid is forced to pass between the outer wall of a tapered needle and the inner wall of a tapered orifice. However, it has been found that these valves tend to drift, that is, change their effective hydraulic diameter after some time which necessitates quite frequent recalibration. The mechanism of this drift is not completely understood but may be the result of some very minute changes in the plug position due to temperature effects or inherent mechanical stresses. It has been observed that very minute side movements of the plug will effectively change the hydraulic diameter of the valve and therefore its specific fluid resistance.

Use of two parallel surfaces as described in my previous U.S. Pat. No. 3,144,879 does indeed solve the problem of not only providing an exact and reproducible flow passage but also one that provides an extremely wide "Rangeability", i.e. the useful ratio of maximum to minimum mass flow range due to the following mathematical relationship.

If one would designate the distance between the two surfaces controlling the amount of fluid resistance as H, and the radial distance the fluid has to travel through as L, then the differential pressure necessary to pass a given mass flow M is $$\Delta p = (kML\nu)/H^3$$

wherein $\nu$ is the kinematic viscosity of the fluid and k is a dimensional constant. Thus adjusting H will change either the mass flow or the differential pressure by the third power ensuring a very wide rangeability for this device.

The above equation illustrates a dependency of mass flow to H to the third power assuming a consistant pressure drop across the valve. With a typical H or gap variation between two controlling surfaces from 0.0001" to 0.01", the controlled range of mass flow is equal to $1:100^3 = 1:10^6$ which indeed was proved to be correct through flow tests conducted on a preferred embodiment of my invention.

As can be appreciated, the task of adjusting the small gap between the two controlling surfaces is of critical importance. Manual adjustment was solved in my previous (referenced) invention by utilizing the digressive motion of two slightly different pitched screw threads located on a common adjusting screw. This solution works fine, where manual adjustment is sufficient, but is not suitable if adjustment should be the consequence of a variation of an electronic or, preferably, pneumatic signal change from a process controlling instrument.

The present invention has overcome the problem of automatic and of minute adjustments of the controlling gap between two throttling surfaces by utilization of hydraulic amplifying means which, when interspaced between conventional linear motion type pneumatic or hydraulic actuators not only reduce motion of these actuators to the small fraction required, but in the process also amplify the force output of those conventional actuators by typically 30 to 50 times thereby effecting closure of said plates against hydrostatic pressure levels exceeding 3000 psi.

Other noteworthy objects of my invention include the provision of packless valve construction, that is, contrary to needle valves, no seals are in sliding contact with the outside means of adjustment commonly referred to as valve stem and the interior parts subjected to the medium to be controlled. Seals in my invention can be static types and therefore are not subject to wear regardless of the frequency of adjustment.

Yet, still another object of my invention is the provision of a laminar flow restriction, which is rugged for long service life and which is easy and inexpensive to manufacture and which does not require matching of parts, hand honing and other special production methods heretofore required by present devices performing similar functions.

A further major improvement over my previous U.S. patent application Ser. No. 146,630 and my continuation in part thereof, filed on Jan. 30, 1981 is the provision of a novel cage trim insert whereby one single gasket seals both high and low pressure portions of this removable trim insert and thereby eliminates all sliding seals of my invention Ser. No. 146,630 and also avoids accidental opening of my invention valve upon loss of hydraulic amplifying fluid, a circumstance not excluded with the design featured in my continuation in part filed on Jan. 30, 1981.

These and other objections and advantages of my invention will best be understood from the following detailed description, when considered in conjunction with the annexed drawings.

DESCRIPTION

Figure 1:
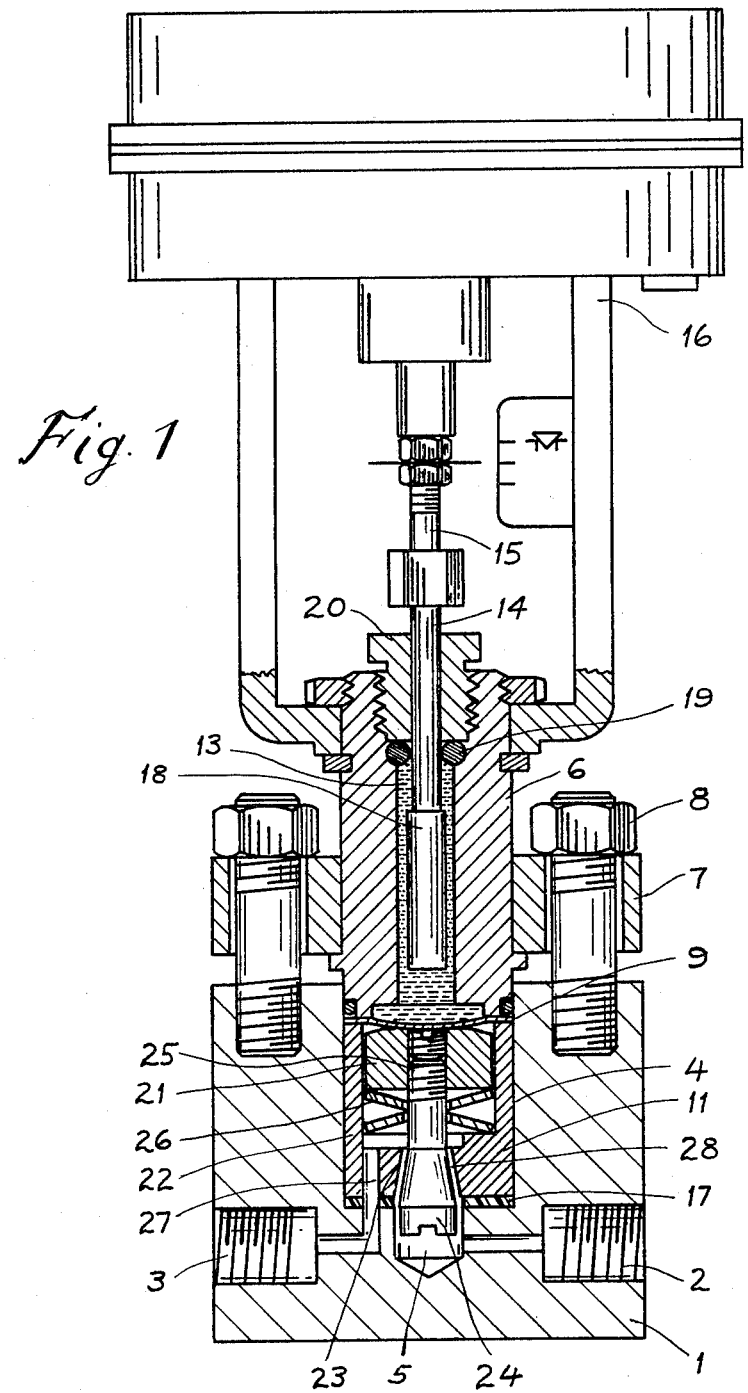
FIG. 1 is a vertical, central, cross-sectional view, showing the preferred structure and arrangement of parts of my invention having conical parallel throttling surfaces.

The subject invention comprises a housing 1 having one inlet port 2 and one outlet port 3 respectively. Housing 1 furthermore has a central longitudinal bore 4 connected to said inlet port by a fluid egress passage 5. The upper terminating end of bore 4 is sealed by means of a bonnet closure 6, bonnet flange 7 and fastening means 8. A flexible diaphragm 9 is interspaced between the lower terminating portion of bonnet 6 and a removable element 11 engaged within housing bore 4.

Element 11 has a flat terminating lower portion which is sealed against a similarly flat surface constituting the lower terminating end of bore 4, by a gasket 17. Bonnet member 6 incorporates a central opening 13 extending throughout its length and enclosing therein a plunger 18 whose upper portion 14 is fastened to a stem extension 15 of a conventional sliding stem type actuating device 16. The lower portion of plunger 18 is totally immersed in a hydraulic fluid contained within opening 13 and enclosed by suitable sealing means 19 retained within the upper portion of bonnet 6 by a threaded retainer 20.

Following a vertically downward movement of actuator stem extension 15, some of the volume of hydraulic fluid contained within opening 13 is displaced, causing a downward deflection of flexible diaphragm 9 which in turn forces a downward movement of a piston 21 slidingly arranged in a central bore of the cage-like outer portion 22 of element 11. Cage 22 also has a lower central bore 23 which, in the shown preferred configuration, has a conical concave shape. Bore 23 engages a similarly cone-shaped valve plug 24 whose upper stem-like threaded extension 25 is engaged with piston 21. Whenever the hydraulic fluid in cavity 13 forces a downward movement of a piston 21 and thereby valve plug 24, it has to overcome the resistance of a pair of conical spring washers 26 whose spring load assures a return of piston 21 and a retraction of valve plug 24 towards tight engagement with cage bore 23 and thereby effecting tight valve closure.

The cavity occupied by spring 26 is able to communicate with outlet port 3 by means of a second fluid egress port 27. When valve plug 24 is extended downward, an annular flow passage 28 is formed between the parallel wall surfaces of the plug and cage bore profiles. Fluid entering inlet port 2 will pass through this flow passage or throttling gap into the cavity occupied by springs 26 and from there through port 27 into outlet port 3.

Gasket 17 has an important function in that it seals not only down stream pressure which may enter longitudinal bore 4 from port opening 27 but it simultaneously prevents higher pressure in fluid egress 5 from leaking into port 27 whenever valve plug 24 is in the closed position. This eliminates the typical requirement in conventional valves to have two separate sealing means, one for the upstream and one for the down stream pressure areas.

It is important to keep the length of the flow passage 28 very long in respect to the distance or width between the plug and cage bore.

The typical maximum width of the gap between surfaces 23 and 24 is 0.005". This, combined with a typical radial distance of fluid travel of 0.250" makes the fluid mechanically important L/d ratio at least 250:1 which will keep most fluid conditions in the Laminar regime which in turn will vary the fluid resistance, or amount of fluid being passed under constant pressure drop, to the third power of the gap width H, as discussed previously. This assures an outstandingly wide range between maximum and minimum controlled flow which far exceeds the capabilities of conventional throttling valves.

For example, a typical embodiment of my invention can vary the amount of gas flow from less than 1 cc/min. at 100 psi pressure drop to more than 10,000 cc/min. In contrast, conventional needle type valves heretofore used, seldom exceed a flow range of 50:1 !

An added benefit from the hydraulic positioning means employed in my invention, is the benefit of force amplification. A typical embodiment of my invention will have a piston 21 diameter of 1" and a plunger 14 diameter of 3/16". Under the assumption that actuator 16 can produce a force of 100 lbs., a hydraulic fluid pressure of $100 \times 0.187^2 \times 3.14/4 = 3621$ psi can be exerted within opening 13, thereby allowing piston 21 to overcome equally high pressure levels of process fluid with the valve itself.

One disadvantage of the shown design is the close proximity of the hydraulic fluid in chamber 13 in respect to the process fluid. Any temperature change in the process fluid will in turn vary the temperature of the hydraulic oil, causing thermal expansion and movement of piston 21 independently of actuator 16. However, compensation can be achieved by selecting the material of plunger 18 having a different coefficient of thermal expansion to that of bonnet closure 6.

While preferred embodiment of my invention has been designed to operate primarily in the Laminar flow regime (i.e. at Reynolds numbers generally below 2,000) it should be understood, that turbulence may exist around entrance and exit ports and may even commence between the parallel surfaces themselves given high enough fluid velocities. It is also quite obvious to employ other than cone-shaped valve plugs or port openings and to replace hydraulic fluid seals with metal bellows to prevent an even so slight leak or evaporaton of hydraulic fluid. This, however, is a purely economic preference and should not be constructed to be a limitation to any of my claims.

It should also be understood, that replacement of the pneumatic or electrical actuator 16 with a suitable handwheel arrangement will render my invention capable of manual adjustment and thereby expand the range of its useful applications without departure from the scope of the following claims.

Having thus clearly shown and described the invention, what is claimed as new and desired to secure by Letter Patent is:

1. Apparatus for controllably restricting the flow of fluid there through which comprises:
    (a) a housing having inlet and outlet ports, a longitudinal bore having one terminating end wall portion and at least one additional port opening connecting externally with said longitudinal bore and through said end wall;
    (b) means for creating frictional flow path being part of a removable element which is located within said longitudinal housing bore and having a lower terminating surface;
    (c) said removable element comprising a cage having a central bore incorporating within a slidable piston member, said cage having a second lower reduced bore communicating with said central bore and engaging therewithin a valve plug suitably connected to said slidable piston to open up a flow passage when retracted from contact with said cage bore;

(d) one or more deformable elements arranged to force said valve plug to engage the lower reduced cage bore to effect tight closure;

(e) a bore penetrating the lower terminating surface of said removable element to provide fluid access from the central bore of said cage to either the inlet or the outlet port of said housing;

(f) gasket means interspaced between said end wall of the longitudinal housing bore and said removable element, said gasket means having suitable openings to conduct fluid to and from, but sealing against, an area occupied by said valve plug and said bore connecting to either inlet or outlet port;

(g) closure member suitably fastened to the opening of said longitudinal bore of the housing to effectively retain said removable element and cover the latter, and having an opening extending through the length of said closure member retaining hydraulic fluid therein;

(h) flexible diaphragm means interspaced between said closure member and said means for creating a frictional flow path;

(i) hydraulic means to effectively position said slidable piston together with said valve plug, said hydraulic means includes external actuating device having a stem-like extension penetrating slidingly into the said hydraulic fluid-filled opening to allow volumetric displacement of fluid to in turn oppose the force of said deformable elements to effect the position of said valve plug, wherein the cross-sectional area of said stem-like extension is significantly smaller than the cross-sectional area of said piston.

2. The apparatus for claim 1 wherein said cage incorporates a second lower bore having a conical concave shape engaging within a valve plug having a complementary convex conical shape and wherein parallel wall surfaces are formed between said bore and the plug when the latter is retracted.

3. The apparatus of claim 2, wherein the ratio between the length and width of a flow passage formed between said parallel wall surfaces of plug and cage bore is at least 30 to 1 when the plug is fully retracted.

4. The apparatus of claim 1, wherein said deformable elements consist of a pair of conical spring washers located within said central cage bore.

5. The apparatus of claim 1, wherein said stem-like extension is constructed from a material having a thermal expansion coefficient substantially different from that of the closure member material.

6. The apparatus of claim 1, wherein said flexible diaphragm means are made from a strain-hardened corrosion resistant material.

* * * * *